United States Patent [19]

Laughon

[11] 4,158,970
[45] Jun. 26, 1979

[54] OVERRIDE ARRANGEMENT AND ACTUATING KNOB FOR A SHIFTING MECHANISM IN PORTABLE TOOLS

[75] Inventor: Thomas C. Laughon, Columbia, Md.

[73] Assignee: Black & Decker Inc., Newark, Del.

[21] Appl. No.: 806,906

[22] Filed: Jun. 15, 1977

[51] Int. Cl.² .......................... G05G 1/04; E02D 7/02
[52] U.S. Cl. .................................. 74/526; 81/52.4 A;
    144/32 R; 173/48; 192/67 R; 192/99 S
[58] Field of Search .................. 192/67 R, 93 R, 99 S;
    74/527, 526; 173/47, 48, 13; 408/139, 132;
    144/32; 81/52.4 A; 310/50

[56] References Cited

U.S. PATENT DOCUMENTS

| | | | |
|---|---|---|---|
| 1,839,648 | 1/1932 | Connell | 144/32 |
| 2,152,517 | 3/1939 | Whitney et al. | 144/32 X |
| 2,940,488 | 6/1960 | Riley, Jr. | 408/139 |
| 3,019,667 | 2/1962 | Bann | 74/526 X |
| 3,043,556 | 7/1962 | Noland | 74/526 X |
| 3,067,629 | 12/1962 | Zurles | 74/526 X |
| 3,174,599 | 3/1965 | Spyridakis | 408/139 |
| 3,178,956 | 4/1965 | Stanley | 192/67 R X |
| 3,712,352 | 1/1973 | Lafferty, Sr. | 144/32 |
| 3,789,933 | 2/1974 | Jarecki | 173/48 |
| 3,837,409 | 9/1974 | Consoli et al. | 173/48 |
| 3,845,826 | 11/1974 | Beisch | 173/48 |
| 3,866,692 | 2/1975 | Stelljes | 173/48 |
| 3,867,988 | 2/1975 | Koehler | 173/48 |
| 3,937,036 | 2/1976 | Sauerwein | 81/52.4 A |
| 4,006,136 | 1/1978 | Wanner et al. | 173/48 |

Primary Examiner—Leslie Braun
Attorney, Agent, or Firm—Walter Ottesen; Leonard Bloom; Edward D. Murphy

[57] ABSTRACT

The invention is directed to an override arrangement and handle for a shifting mechanism in portable tools. The portable tool includes a housing and a drive motor mounted in the housing. A case extends from the housing and a transmission is operatively connected to the motor and mounted in the case. A shifting mechanism engages the transmission for adjusting the same between at least two modes of operation. The shifting mechanism includes a shaft penetrating the case and rotatable between two positions corresponding to respective ones of the modes of operation. The improvement includes a handle attached to the shaft that is contoured so as to abut against the case when the handle is rotated past one of the two positions thereby preventing the operator of the tool from overriding the one position.

4 Claims, 14 Drawing Figures

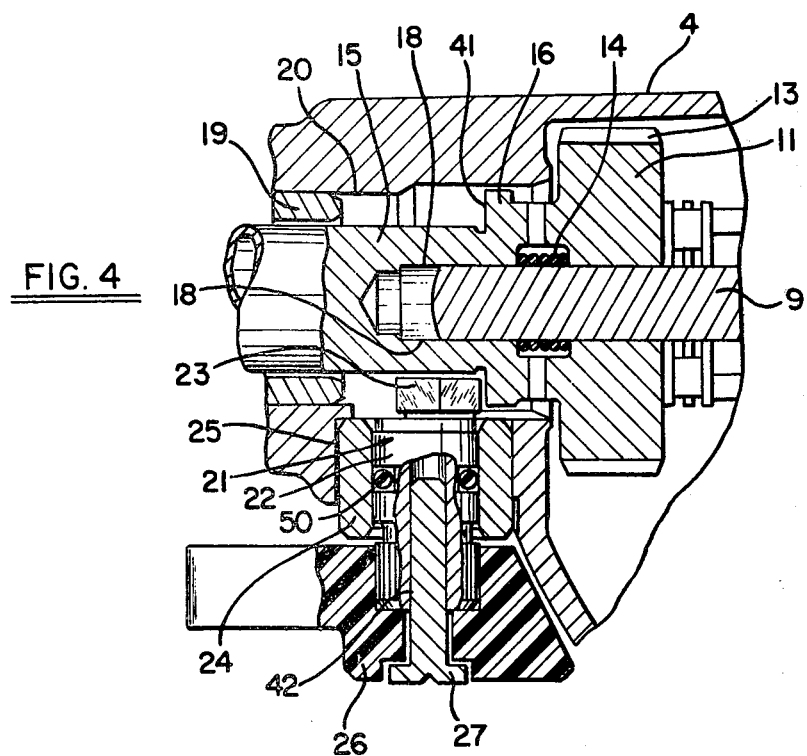
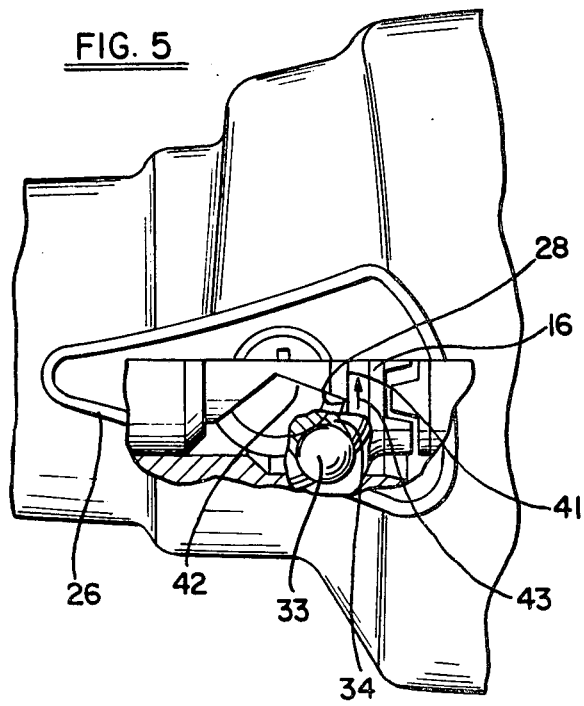
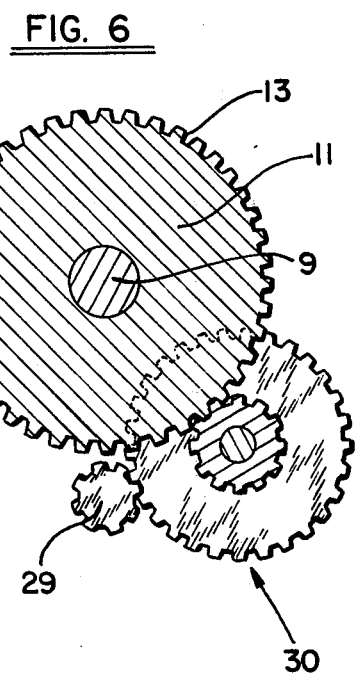

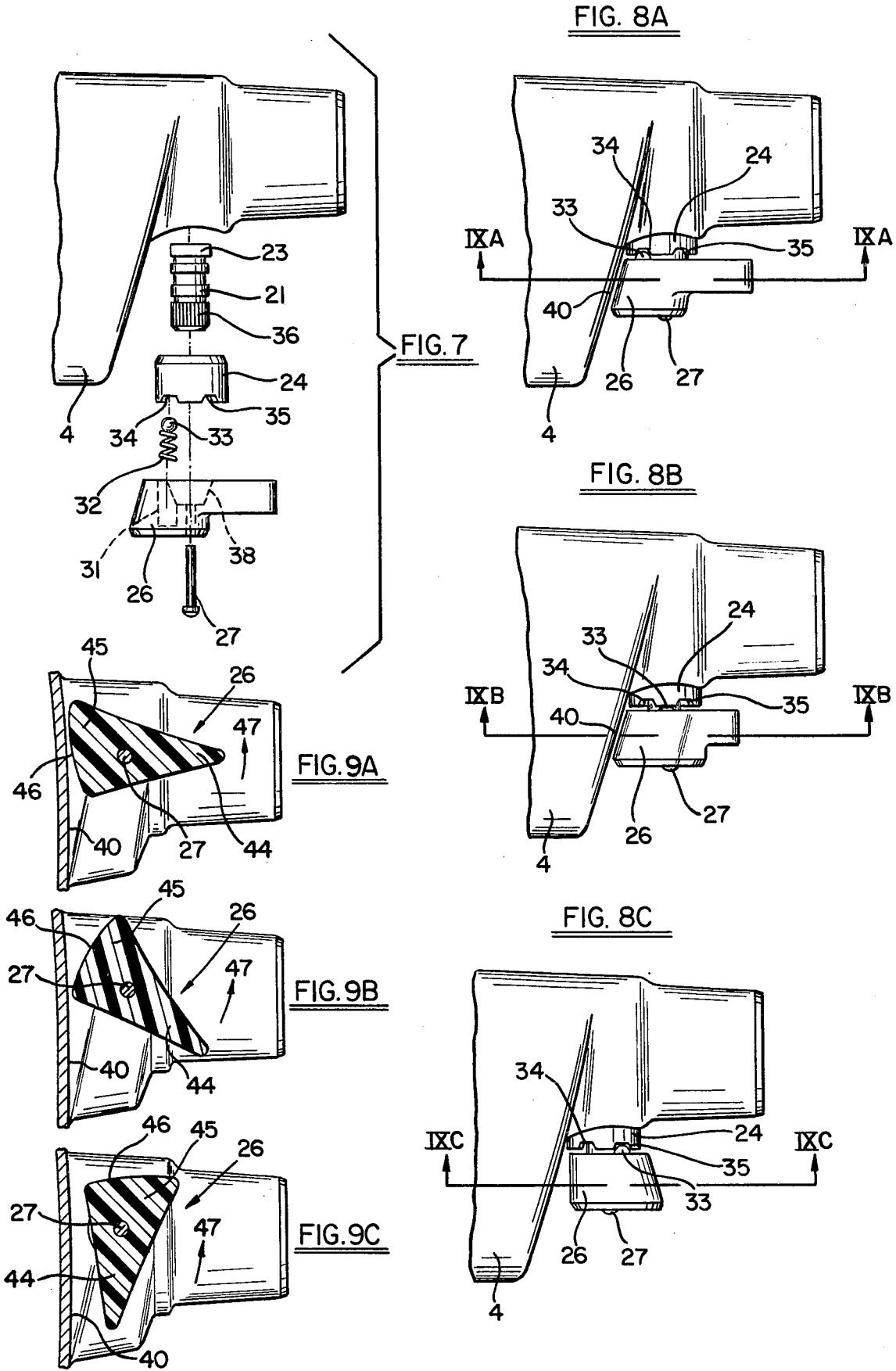

OVERRIDE ARRANGEMENT AND ACTUATING KNOB FOR A SHIFTING MECHANISM IN PORTABLE TOOLS

BACKGROUND OF THE INVENTION

My invention relates to an override arrangement and actuating handle for a shifting mechanism in portable tools which prevents the operator of such a tool from inadvertently overriding a stop position of the shifting mechanism.

Power driven portable tools usually include a transmission for connecting the drive motor of the tool to the output of the tool where a tool element is attached for performing the work on the workpiece. The transmission usually is contained in a gear case attached to a housing for the drive motor and includes a set of gears for reducing the speed of the bit to a useable level as well as for increasing the torque output available at the output of the tool.

In the case of a two-speed power tool, there is usually provided a mechanical transmission which utilizes one or more sliding gears, or else a sliding gear cluster, to shift from one speed to another. The gears are alternately engaged and disengaged from the drive mechanism with the aid of a shifting mechanism. The shifting mechanism usually has a shaft which can be rotated to achieve the desired gear engagement for a specific operating speed. One end of the shaft penetrates the gear case wall and has a handle attached thereto which is manually actuable by the operator of the tool. Typically, the handle is rotated between two positions corresponding to respective speeds at which the tool is to operate. If excessive force is utilized to rotate the handle, the shaft can be rotated beyond one of its end position possibly causing damage to the transmission.

In some tools such as a power-driven portable combination drill and screwdriver, the transmission will include a clutch so that the tool may be adjusted to provide either a positive drive connection between the motor and the tool element or a drive connection that can be established and interrupted at will by the person operating the tool when required by the nature of the work. Such a combination tool can include a shifting mechanism that has a rotatable shaft penetrating the gear case as suggested for example, in a patent application entitled: "Power-Driven Drill and Screwdriver" of Robert Gordon Moores, Jr., and Charles Edward Hopkins, Sr., filed on June 15, 1977, and having Ser. No. 806,907.

In the case of the power driven drill and screwdriver, there is a clutch arrangement which is actuable to disconnect the tool element from the drive motor. The clutch arrangement includes two clutches having respective sets of clutch teeth formed thereon. The shifting mechanism is actuated to engage and disengage the clutch teeth corresponding to the screwdriving and drill modes of the tool. If the teeth are too tightly engaged when the operator places the tool in the drill mode, damage can occur for example at the interface of the one of the clutch members and the portion of the shifting mechanism engaging the same. Accordingly, it is desirable that some means be provided to prevent the operator of the tool from inadvertently rotating the shaft of the shifting mechanism beyond the limit position corresponding to the drill mode.

SUMMARY OF THE INVENTION

In view of the aforegoing, it is an object of my invention to provide an override arrangement and actuating handle for a shifting mechanism in portable tools which will prevent an operator of a tool from inadvertently rotating the actuating handle beyond a predetermined limit position.

The improvement according to my invention is applicable to portable tools including a housing and a drive motor mounted in the housing. A case extends from the housing and contains a transmission which is operatively connected to the motor. A shifting mechanism engages the transmission for adjusting the same between at least two modes of operation. The shifting mechanism includes a shaft which penetrates the case and is rotatable between at least two positions corresponding to respective ones of the modes of operation. The improvement according to my invention includes the feature of a handle attached to the shaft that is contoured so as to abut against the case when the handle is rotated past at least one of the two positions thereby preventing the operator of the tool from overriding the one position.

According to another feature of my invention, I construct the case of the portable tool so that it has a substantially flat outer wall surface adjacent the handle attached to the shaft of the shifting mechanism. The handle is contoured so as to have a mid portion connected to the shaft and an end portion extending outwardly away from the mid portion. The end portion of the handle is preferably in the form of a cam like lobe having a surface contoured so as to cause the handle to abuttingly engaged the wall surface when the handle is rotated beyond the one position in one angular direction and to clear the wall surface when the handle is rotated away from the one position to the other position in an angular direction opposite to the above-mentioned one angular direction.

BRIEF DESCRIPTION OF THE DRAWING

The above and other objects and advantages of the invention will become more apparent from a reading of the specification taken in conjunction with the enclosed drawings, in which:

FIG 4 is also a side elevation view partially in section along line A—A of FIG. 1B and shows the eccentric member rotated so as to bring the clutches into mutual engagement for operation of the tool in the drill mode;

FIG. 5 is a view looking at the bottom gear case in the region of the shifting arrangement with a partial cut-out to show how the cam of the eccentric member engages the flange of the spindle when the tool is in the drill mode;

FIG. 6 is a view taken along line B—B of FIG. 2 and shows only the gear reduction arrangement mechanically connecting the motor pinion to the first clutch of the clutch arrangement.

FIG. 7 is an assembly view showing the individual parts of the shifting arrangement including the handle attached to the eccentric member;

FIG. 8A shows the shift handle in the drill mode with the detent member engaged in the detent corresponding to the drill mode;

FIG. 8B illustrates the shift handle between the detents corresponding to the drill mode and screwdriving mode, respectively;

FIG. 8C illustrates the shift handle in the screwdriver mode with the detent member engaging the detent corresponding to the screwdriver mode; and, FIGS. 9A to 9C are section views taken along lines IXA—IXA of FIG. 8A, IXB—IXB of FIG. 8B, and IXC—IXC of FIG. 8C, respectively.

DESCRIPTION OF THE PREFERRED EMBODIMENTS OF THE INVENTION

The override arrangement and actuating handle for a shifting mechanism in portable tools is applicable to a wide variety of portable tools. The specific illustration of the improvement according to my invention in the context of a portable power-driven drill and screwdriver is only for convenience and clarity of understanding and does not thereby limit the scope of the invention.

Figure 1A:
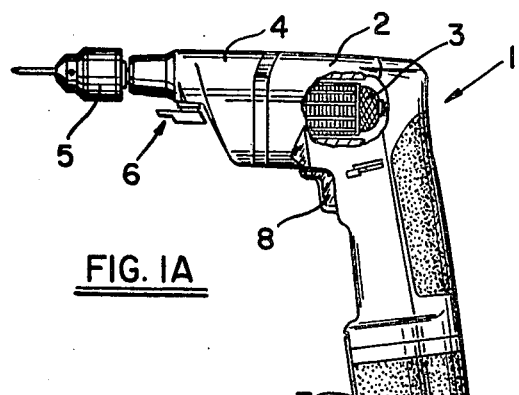
FIG. 1A is a side elevation view of a power driven drill and screwdriver tool equipped with the improvement according to my invention.
Figure 1B:
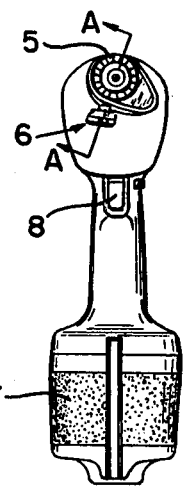
FIG. 1B is a front elevation view of the tool shown in FIG. 1A.

An elevation view of a power-driven combination drill and screwdriver incorporating the improvement according to the invention is shown in FIG. 1 and is designated by reference numeral 1. The combination drill and screwdriver is the subject matter of the patent application entitled: "Power-Driven Drill and Screwdriver" filed in the U.S. Patent and Trademark Office in the name of Robert Gordon Moores, Jr., and Charles Edward Hopkins, Sr., filed on June 15, 1977, and having Ser. No. 806,907.

The tool includes a piston grip housing 2 wherein there is contained the drive motor 3 and trigger 8 for actuating the tool. A source of energy is provided by a battery pack 7 which engages the housing 2 and is described in detail in U.S. Pat. No. 3,999,110 assigned to The Black and Decker Manufacturing Company of Towson, Maryland. The tool can also be adapted to be supplied with electric power through a cord set in lieu of a battery pack. A case 4 is attached to the housing 2 and contains the clutch arrangement and speed reduction gear assembly. The shifting arrangement is indicated by reference numeral 6.

Figure 2:
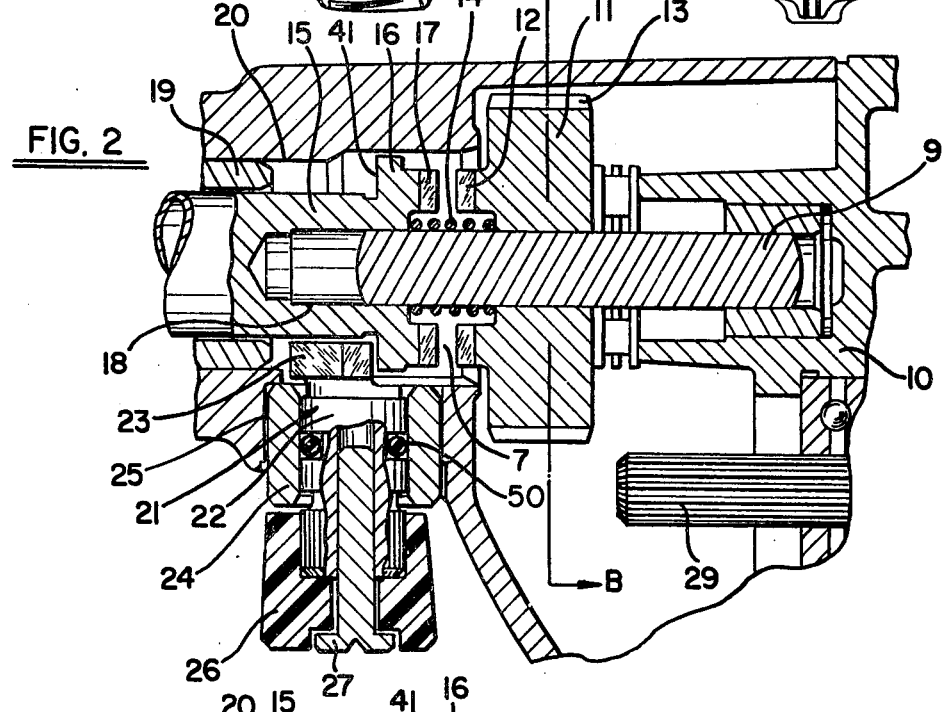
FIG. 2 is a side elevation view of the front end of the tool including the gear case partially cut away and in section taken along line A—A of FIG. 1B to show the clutches disengaged and the eccentric member positioned for operation of the tool in the screwdriver mode.

In FIG. 2 the first and second clutches and the shifting arrangement are shown for the screwdriver mode of the tool. The case 4 is shown cut-away to expose the clutch arrangement 7. A shaft 9 is rotatably journalled at one end in the gear case cover 10. A first clutch 11 is fixedly mounted on the shaft 9. The clutch 11 has clutch teeth 12 and a gear 13 formed thereon. The clutch 11 is rotatably driven by the drive motor 3 through a reduction gear assembly shown in FIG. 6. Referring now to FIG. 6, the clutch 11 is driven by motor 3 having a drive pinion 29 mechanically coupled to the gear 13 formed on the clutch 11. Between the pinion and gear is interposed a suitable gear reduction means designated by reference numeral 30 in FIG. 6.

The second clutch 16 includes the output spindle 15 rotatably and slideably mounted in bearing 19 press-fitted into a bore 20 of the case 4. Clutch teeth 17 are formed on the end-face of the second clutch 16. The output spindle 15 has a bore 18 formed therein slideably engaging and rotatably journalling the shaft 9 at its other end. A spring 14 urges the second clutch 16 away from the first clutch 11.

Because of the output spindle 15 and the bearing 19, the second clutch 16 is, in effect, rotatably mounted in the bearing 19 of case 4 so as to be slideably movable relative to the first clutch 11 between a first location whereat the second clutch firmly engages the first clutch and a second location whereat the second clutch 16 is disengaged from the first clutch 11.

A shifting arrangement is provided to shift the tool from the screwdriving mode to the drill mode and includes an eccentric member 21 having a shaft 22 with a sector cam 23 eccentrically disposed at one end thereof. The shaft 22 is rotatably mounted in a sleeve 24 which, in turn, is press-fitted into a bore 25 of case 4. An O-ring seal 50 is provided to prevent grease from leaking out of the case 4. The shifting arrangement is sealed inside the case 4 and is protected from damage by the contour of the tool.

Figure 3:
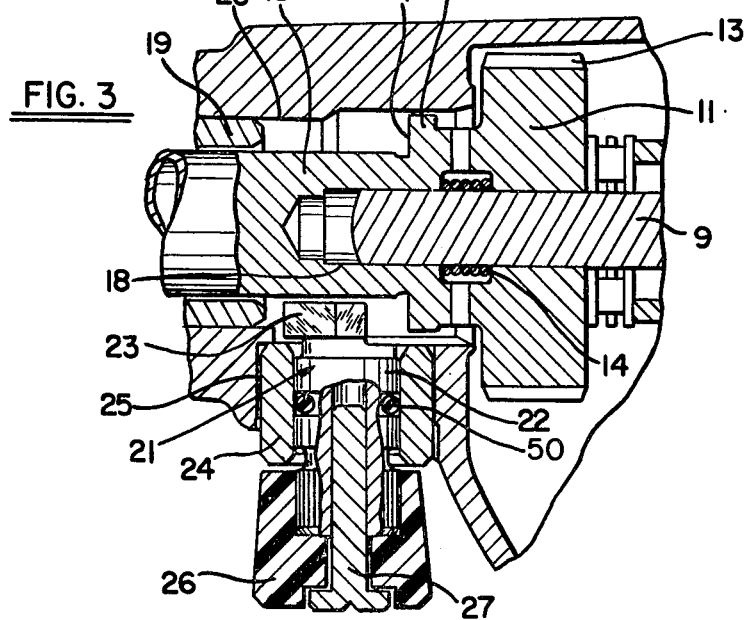
FIG. 3 is likewise a side elevation view partially in section, taken along line A—A of FIG. 1B and shows the clutch teeth engaged with the tool in the screwdriver mode after the operator has engaged a screw and has applied pressure to the tool.

FIG. 3 shows the combination drill and screwdriver in the screwdriver mode, however, for the condition of the clutch arrangement 7 where the operator of the tool is applying pressure to the tool to drive the fastener, say a screw, (not shown).

In the screwdriving mode shown in FIG. 3, the eccentric member 21 is still in the same position as that shown in FIG. 2 and the spindle 15 and second clutch 16 have been pushed axially into the tool so that the teeth 17 and 12 of the first and second cluthces are in mutual engagement and the spring 14 is in compression. When the fastener tightens in the workpiece, the clutches begin to ratchet in the conventional manner to prevent the fastener from becoming stripped or otherwise damaged. The eccentric member 21 with its cam 23 also acts to establish a limit in screwdriving mode as to how far forward the spindle 15 can slide thereby preventing the spindle 15 from protruding outside of the case 4 at the front end of the tool so that it will not pick up dust which could score the bearing 19.

The cam 23 is mounted at the upper end of shaft 22 which extends into the region between the bearing 19 and the clutch 16. The eccentric member 21 is rotatably mounted so as to be adjustable from one position corresponding to the screwdriving mode of the tool shown in FIGS. 2 and 3 to another position corresponding to the drill mode of the tool shown in FIG. 4. The eccentric member 21 acts on the clutch 16 to counteract the urging force of the biasing means 14 and to displace the second clutch 16 into its first location when the eccentric member 21 is rotated. When eccentric member 21 is rotated to place the tool in the drill mode, the cam 23 engages the rear end-face 41 of the second clutch 16 at the cam edge 28.

FIG. 5 includes a cut-away view from below and shown how the cam edge 28 engages the clutch 16 to hold the clutch 16 in its first location corresponding to the drill mode.

To facilitate rotation of the eccentric member 21, a manually-adjustable handle 26 is provided for adjusting the eccentric member 21 between its two positions. A screw 27 holds the handle 26 and threadably engages a threaded bore 42 in the eccentric member 21.

FIG. 7 is an assembly view showing various parts of the shifting arrangement. The sleeve 24 is press-fitted into the case 4 and the eccentric member 21 is journalled in the sleeve 24. The handle 26 is provided with a bore 31 for accommodating a spring 32 and detent member in the form of a ball 33. The sleeve 24 is provided with first and second limit stops in the form of detents 34 and 35 which coact with the spring-loaded detent ball 33. The detents 34 and 35 and spring-loaded detent ball 33 conjointly define first and second limit means which coact with the handle 26 for defining the two positions of the eccentric member 21 corresponding respectively to the first and second locations of the second clutch 16. A partial cut-away in FIG. 5 shows the detent ball engaging the detent 34.

The handle 26 is connected to the eccentric member in a manner to cause a first limit stop to correspond to one of the locations of the clutch 16 and the second limit stop to correspond to the other one of the locations of the clutch 16. In this way, the clutch 16 is accurately positioned for each mode of the tool operation. The handle 26 is preferably made of glass-filled nylon as this makes it unnecessary to perform a machine operation thereon.

The eccentric member 21 has serrations 36 formed thereon at its lower end which form serrations on the lower wall portion of an opening 38 in the handle 26 when the latter is pressed thereon. The opening 38 in handle 26 has a wall surface corresponding to that of a conical frustum. The serrations 36 enable the handle 26 to be connected to the eccentric member 21 so as to cause the first detent 34 to correspond to one of the positions of the eccentric member and the second detent 35 to correspond to the other one of the positions of the eccentric member 21.

When the tool is assembled, the eccentric member 21 is rotated so as to cause the cam 23 formed thereon to hold the second clutch 16 in close engagement with the first clutch 11. The handle 26 is then press-fitted onto the eccentric member 21 so that the spring-loaded detent ball 33 engages the detent 34 corresponding to the drill mode. Thus, each time the handle 26 is shifted to place the tool in the drill mode, the clutches 16 and 11 will be in close engagement to the same extent.

The serrations 36 cut corresponding serrations into the glass-filled nylon handle 26 when the same is press-fitted onto the serrated end of the shaft of the eccentric member 21. Placing the handle 26 on the shaft of the eccentric member 21 in the manner described above insures that the handle 26 can be located accurately on the eccentric member 21 so that the detent ball 33 will line up with the detents formed in the sleeve 24 for the first and second locations of the second clutch. The serrations 36 and the corresponding serrations cut into handle 26 further assure that the eccentric member 21 will not shift with respect to the handle 26 after the tool has been assembled thereby assuring that each time the operator places the tool in the drill mode a close positive engagement of the clutch members is provided thereby minimizing wear on the clutch teeth and precluding slippage in the drill mode for the life of the tool.

FIG. 8A shows the handle 26 and detent ball 33 engaging detent 34 for the drill mode of the tool. FIG. 8C on the other hand shows the handle rotated approximately 90° and the detent ball 33 engaging the detent 35 for the screwdriving mode of the tool. FIG. 8B shows the handle about midway between the detents 34 and 35.

Referring now to FIG. 9A, the handle 26 is dimensioned in size and contoured so that one of its surfaces 46 will abuttingly engage surface 40 of the gear case 4 if the handle is rotated beyond the detent 34 corresponding to the drill mode of the tool thereby preventing the operator from holding second clutch 16 too tightly against the first clutch 11. This is shown with special clarity in FIG. 9A which is taken along line IXA—IXA of FIG. 8A. The gear case 4 has a substantially flat outer wall surface 40 adjacent the handle 26. The handle 26 has a mid portion 44 connected to the shaft of eccentric member 21 with the aid of screw 27. The handle 26 also has an end portion 45 extending outwardly away from said mid portion 44. The end portion 45 is in the form of a cam-like lobe having a surface contoured so as to cause the handle to abuttingly engage the wall surface 40 approximately at the location indicated by reference number 46 when the handle 26 is rotated beyond the position defined by detent 34 in an angular direction 47 and to clear the wall surface 40 when the handle 26 is rotated away from the position shown in FIG. 9A to the other position shown in FIG. 9C and defined by detent 35; this rotation is in an angular direction opposite to the angular direction 47. FIG. 9B is taken along line IXB—IXB of FIG. 8B and shows how the handle 26 clears the wall surface 40 as it is rotated from the position shown in FIG. 9A to the position shown in FIG. 9C.

This coaction of a handle 26 of the shifting mechanism and the outer wall surface 40 of the gear case 4 consitutes an override arrangement to prevent the operator of the tool from overriding at least one of the positions to which the handle 26 can be rotated. If the case wall 4 and handle 26 did not coact to limit rotation of the eccentric member 21 beyond detent 34, then the operator could inadvertently bring the clutches 16 and 11 so tightly together that the engaging edge 28 of sector cam 23 could be worn down on the back end-face 41 of the clutch 16 tending to the situation wherein the cam could no longer reliably bring the second clutch 16 into its first location.

When the clutches 16 and 11 only closely engage and the detent ball 33 engages detent 34, a minimal amount of contact and consequent wear will occur between the surface 41 of clutch 16 and the cam 23 at its engaging edge 28 only when the operator runs the tool without applying pressure thereto. When the operator applies pressure to the tool, the clutches 16 and 11 will then very tightly engage causing the end face 41 of clutch 16 to back off of the cam edge 28 a few millimeters so that no engagement therebetween will occur. In addition and referring to FIG. 5, because of the angle that the radial cam surface 42 makes with respect to the direction of rotation of the clutch 16, indicated by arrow 43, the cam edge 28 will not bite into the clutch end-face 41, but rather will merely drag over it causing only minimal wear.

I claim:

1. In a power-driven drill and screwdriver including: a housing; a drive motor mounted in the housing; a case attached to the housing; a first clutch member rotatably mounted in the case and operatively connected to the drive motor; a second clutch member rotatably mounted in the case and slideably movable relative to the first clutch member between a first location whereat the second clutch member firmly engages the first clutch member and a second location whereat the second clutch member is disengaged from the first clutch member; means biasing the second clutch member into the second location; an eccentric member rotatably mounted on the case so as to be rotatable from one position thereon corresponding to the screwdriving mode of the tool to another position thereon corresponding to the drill mode of the tool; the eccentric member being arranged in the case with respect to the second clutch member to counteract the urging force of the biasing means and to displace the second clutch member into the first location when the eccentric member is rotated from the one position to the other position, said eccentric member including a shaft portion penetrating said case; a manually-adjustable handle attached to said shaft portion for rotating the eccentric member between the two positions; first limit means and second limit means coacting with the handle for defining said positions, respectively; the improvement which comprises: said case defining a smooth uninterrupted outside wall surface in the immediate vicinity of said handle, said handle being contoured so as to abut against said outside wall surface when the handle is rotated past one of said first limit means and said second limit means whereby the operator of the power-driven drill and screwdriver is prevented from overriding said one limit means; said case having a substantially flat outer wall surface adjacent said handle, said handle having a mid portion connected to said shaft and an end portion extending outwardly away from said mid portion, said end portion being in the form of a cam-like lobe having a surface contoured so as to cause said handle to abuttingly engage said wall surface when said handle is rotated beyond said one limit means in one angular direction and to clear said wall surface when said handle is rotated away from said one limit means to the other one of said first limit means and said second limit means in an angular direction opposite to said one angular direction.

2. In a portable tool including a housing, a drive motor mounted in the housing, a case extending from the housing, a transmission operatively connected to the motor and mounted in the case, shifting means engaging the transmission for adjusting the same between at least two modes of operation, said shifting means including a shaft penetrating the case and rotatable between two positions corresponding to respective ones of the modes of operation, the improvement which comprises: a handle attached to the shaft, the case defining a smooth uninterrupted outside wall surface in the immediate vicinity of said handle, said handle being contoured so as to abut against said outside wall surface when the handle is rotated past at least one of the two positions thereby preventing the operator of the tool from overriding said one position; said case having a substantially flat outer wall surface adjacent said handle, said handle having a mid portion connected to said shaft and an end portion extending outwardly away from said mid portion, said end portion being in the form of a cam-like lobe having a surface contoured so as to cause said handle to abuttingly engage said wall surface when said handle is rotated beyond said one position in one angular direction and to clear said wall surface when said handle is rotated away from said one position to said other position in an angular direction opposite to said one angular direction.

3. In a portable, hand-held drill and screwdriver tool including a housing, a drive motor mounted in the housing, a case extending from the housing, a transmission operatively connected to the motor and mounted in the case, shifting means engaging the transmission for adjusting the same between at least two modes of operation, said shifting means including a shaft penetrating the case and rotatable between two positions corresponding to respective ones of the modes of operation, the improvement which comprises: a non-symmetrical handle attached to the shaft, the case defining a smooth uninterrupted outside wall surface in the immediate vicinity of said handle, said handle being contoured so as to abut against said outside wall surface when the handle is rotated past at least one of the two positions thereby preventing the operator of the tool from overriding said one position.

4. In a power-driven portable, hand-held drill and screwdriver including: a housing; a drive motor mounted in the housing; a case attached to the housing; a first clutch member rotatably mounted in the case and operatively connected to the drive motor; a second clutch member rotatably mounted in the case and slideably movable relative to the first clutch member between a first location whereat the second clutch member firmly engages the first clutch member and a second location whereat the second clutch member is disengaged from the first clutch member; means biasing the second clutch member into the second location; an eccentric member rotatably mounted on the case so as to be rotatable from one position thereon corresponding to the screwdriving mode of the tool to another position thereon corresponding to the drill mode of the tool; the eccentric member being arranged in the case with respect to the second clutch member to counteract the urging force of the biasing means and to displace the second clutch member into the first location when the eccentric member is rotated from the one position to the other position, said eccentric member including a shaft portion penetrating said case; a manually-adjustable non-symmetrical handle attached to said shaft portion for rotating the eccentric member between the two positions; first limit means and second limit means coacting with the handle for defining said positions, respectively; the improvement which comprises: said case defining a smooth uninterrupted outside wall surface in the immediate vicinity of said handle, said handle being contoured so as to abut against said outside wall surface when the handle is rotated past one of said first limit means and said second limit means whereby the operator of the power-driven drill and screwdriver is prevented from overriding said one limit means.

* * * * *